(12) United States Patent
Pomerantz

(10) Patent No.: US 9,587,660 B2
(45) Date of Patent: Mar. 7, 2017

(54) CONNECTOR

(75) Inventor: Joseph Pomerantz, Moorpark, CA (US)

(73) Assignee: ADVANTEK MARKETING, INC., Moorpark, CA (US)

( * ) Notice: Subject to any disclaimer, the term of this patent is extended or adjusted under 35 U.S.C. 154(b) by 115 days.

(21) Appl. No.: 13/566,582

(22) Filed: Aug. 3, 2012

(65) Prior Publication Data

US 2013/0034382 A1    Feb. 7, 2013

Related U.S. Application Data

(60) Provisional application No. 61/515,518, filed on Aug. 5, 2011.

(51) Int. Cl.
| | |
|---|---|
| *F16B 9/02* | (2006.01) |
| *A01K 1/03* | (2006.01) |
| *E04H 1/12* | (2006.01) |
| *F16B 7/04* | (2006.01) |
| *E04B 1/00* | (2006.01) |

(52) U.S. Cl.
CPC ............. *F16B 9/023* (2013.01); *A01K 1/034* (2013.01); *E04B 2001/0092* (2013.01); *E04H 1/1205* (2013.01); *F16B 7/0433* (2013.01); *Y10T 403/44* (2015.01); *Y10T 403/55* (2015.01)

(58) Field of Classification Search
CPC ....... E04H 17/16; E04H 17/168; E04H 17/18; E04H 1/1205; Y10T 403/42; Y10T 403/44; F16B 5/00; F16B 5/0004; F16B 9/02; F16B 9/023; F16B 7/0433

USPC ... 256/24, 27, 28, 65.14; 135/121, 135, 147, 135/148, 152, 120.3, 158–160; 52/655.1, 52/261; 403/205, 217–219, 403

See application file for complete search history.

(56) References Cited

U.S. PATENT DOCUMENTS 93,860 A * 8/1869 Crull ............................... 256/28
2,652,025 A * 9/1953 Beatty ............................ 119/519
(Continued)

FOREIGN PATENT DOCUMENTS

| CN | 1076987 | 10/1993 |
|---|---|---|
| CN | 2266627 | 11/1997 |

(Continued)

OTHER PUBLICATIONS

First Office Action from Chinese Patent Appl. No. 201210278110.5, dated Nov. 20, 2015 (008-17-009CN).

(Continued)

*Primary Examiner* — Daniel P Stodola
*Assistant Examiner* — Jonathan Masinick
(74) *Attorney, Agent, or Firm* — Koppel, Patrick, Heybl & Philpott

(57) ABSTRACT

A connector includes at least two cavities or receptacles extending from a base to receive adjacent tubes of a wall or panel. The receptacles are closed at one end. At least two walls extend from the base in the same direction as the receptacles. The walls are positioned on the base and outside the receptacles such that the panels are secured to a specific angular orientation with respect to each other. A top connector and a bottom connector are used to secure rods or tubes of adjacent panels. A series of top and bottom connectors can be used to secure multiple panels to form an enclosure, such as a kennel or gazebo.

17 Claims, 5 Drawing Sheets

(56) References Cited

U.S. PATENT DOCUMENTS

| | | | |
|---|---|---|---|
| 3,020,023 A * | 2/1962 | MacIntyre et al. | 256/24 |
| 4,318,628 A * | 3/1982 | Mancini | 403/231 |
| 4,817,655 A * | 4/1989 | Brooks | 135/121 |
| 4,867,420 A * | 9/1989 | Anderson | 256/1 |
| 5,732,726 A * | 3/1998 | Lee | 135/156 |
| 6,540,209 B2 * | 4/2003 | Ross | 256/68 |
| 6,554,257 B1 * | 4/2003 | Kenton | 256/24 |
| 6,666,223 B2 * | 12/2003 | Price et al. | 135/131 |
| 7,500,654 B2 * | 3/2009 | Rosaen | 256/65.14 |
| 7,565,909 B2 * | 7/2009 | Reis et al. | 135/115 |
| 8,360,085 B2 * | 1/2013 | Lee | 135/135 |
| 8,448,656 B2 * | 5/2013 | Choi | 135/135 |
| 8,739,476 B1 * | 6/2014 | Royer | 52/82 |
| 2006/0011901 A1 * | 1/2006 | Anson et al. | 256/65.14 |
| 2006/0130887 A1 * | 6/2006 | Mallookis et al. | 135/122 |
| 2011/0073147 A1 * | 3/2011 | Choi | 135/135 |
| 2012/0009010 A1 * | 1/2012 | Wu | 403/217 |
| 2012/0312761 A1 * | 12/2012 | White | 211/13.1 |

FOREIGN PATENT DOCUMENTS

| | | | |
|---|---|---|---|
| CN | 2550449 | 5/2003 | |
| CN | 1826453 | 8/2006 | |
| WO | WO 2009071026 A1 * | 6/2009 | E04H 15/44 |

OTHER PUBLICATIONS

Second Office Action from Chinese Patent Appl. No. 201210278110.5, dated Jul. 1, 2015.

* cited by examiner

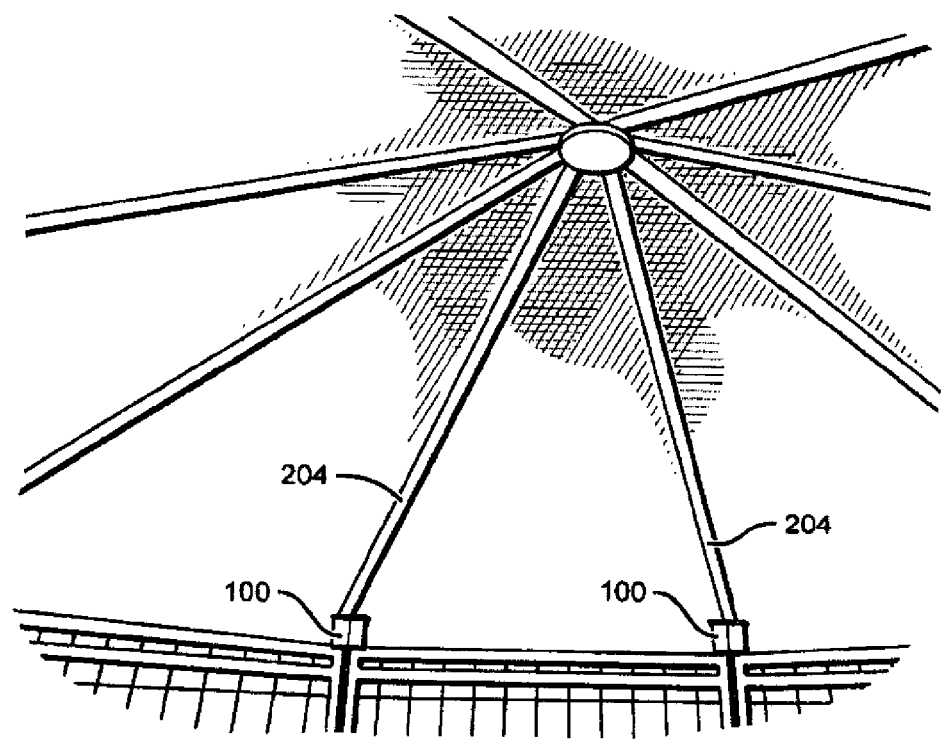
FIG. 3A
FIG. 4A
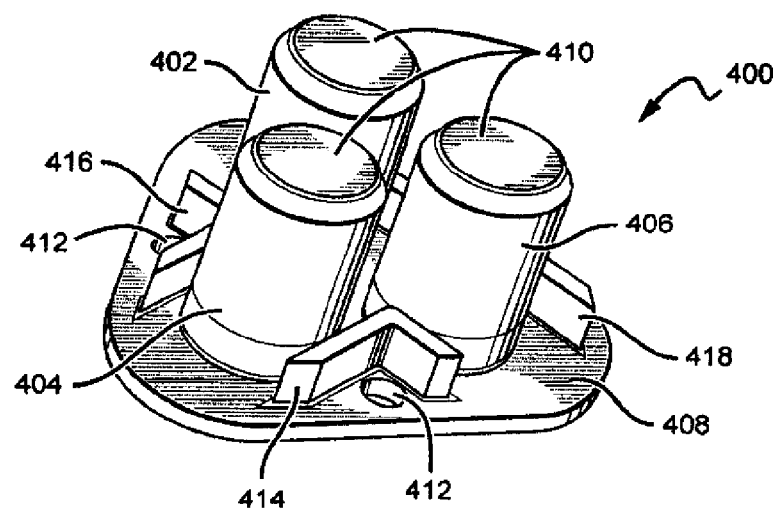

CONNECTOR

CROSS REFERENCE TO RELATED APPLICATION

The present application claims priority to U.S. Provisional Patent Appl. Ser. No. 61/515,518, filed Aug. 5, 2011.

BACKGROUND

Field of the Invention

The present invention generally relates to connectors, and more particular to connectors for a housing, such as a gazebo or kennel Related Art There are many types of connectors for many types of uses. However, not all connectors can be used for all purposes. For example, for a kennel or gazebo, suitable connectors may include screws, bolts, plates, and brackets to connect walls of the structure. However, such connectors may be difficult to install, provide limited flexibility, and other disadvantages.

Therefore, a need exists for a specialized connector for use with a modular structure, such as a kennel or gazebo, that is easy to use, secure, and flexible.

SUMMARY

According to one embodiment, a connector includes at least two cavities or receptacles extending from a base to receive adjacent tubes of a wall or panel. The receptacles are closed at one end. At least two walls extend from the base in the same direction as the receptacles. The walls are positioned on the base and outside the receptacles such that the panels are secured to a specific angular orientation with respect to each other. A top connector and a bottom connector are used to secure rods or tubes of adjacent panels. A series of top and bottom connectors can be used to secure multiple panels to form an enclosure, such as a kennel or gazebo. The base of the connector also has a hole positioned between adjacent receptacles for allowing a rod or tube to be inserted therein. The rods extending from each connector can then be used to support a cover to cover the enclosure.

In one embodiment, a connector has two receptacles with walls that have an approximately 45° angle, where the two receptacles are between the two opposing walls. In another embodiment, a connector has three receptacles in a triangular pattern formed on a triangular base. A first side of the base has two straight walls, each adjacent and outside a receptacle, with a hole between the two straight walls. The two other sides of the base each have a right-angled walls between and exterior to two adjacent receptacles, with a hole within each angled wall.

Such connectors can be used to connect and lock tubular steel pieces together at a variety of angles from 45° to 315° at 45° intervals. These unique connectors incorporate walls that restrict the panels from movement once they are placed in the desired position. As a result, an enclosure can be easily set up (and changed or expanded).

These and other features and advantages of the present disclosure will be more readily apparent from the detailed description of the embodiments set forth below taken in conjunction with the accompanying figures.

BRIEF DESCRIPTION OF THE FIGURES

FIGS. 3A and 3B are pictures of an enclosure with a cover secured with the connectors of FIGS. 1A-1C according to one embodiment;

FIG. 4A is a perspective view of one embodiment of a three receptacle connector;

Figure 1:
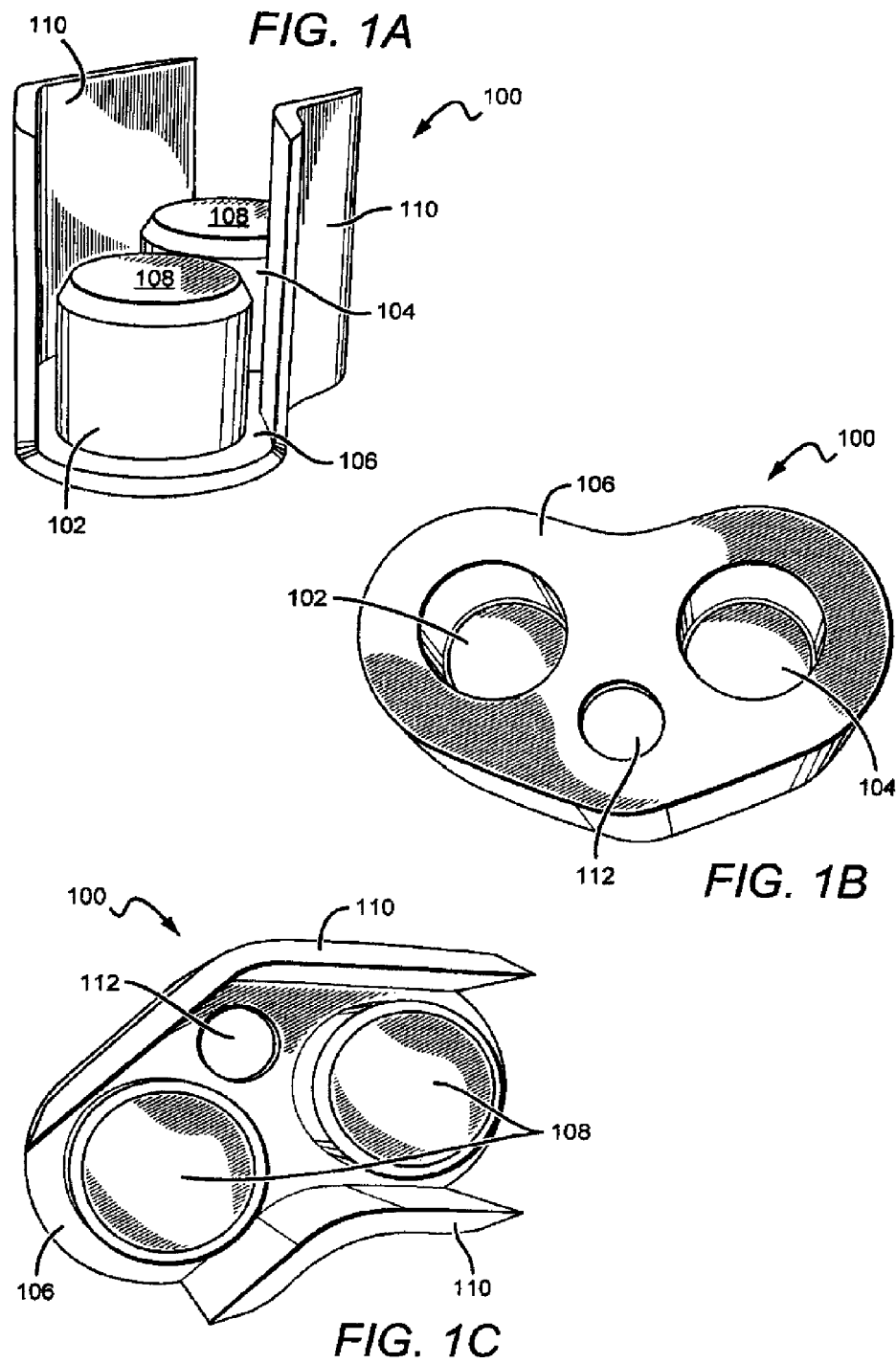
FIG. 1A is a perspective view of one embodiment of a two receptacle connector.
FIG. 1B is a view of one side of the connector of FIG. 1A according to one embodiment.
FIG. 1C is a view of the opposing side of the connector of FIGS. 1A and 1B according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIGS. 1A-1C show a two-receptacle connector 100 according to one embodiment. In FIG. 1A, a first receptacle 102 and a second receptacle 104 extend from a base 106. Each receptacle has a close end 108. Exterior to each receptacle is a wall 110 extending from base 106 in the same direction as receptacles 102 and 104. Each wall is angled or curved approximately 45°, such that adjacent walls are kept at that 45° angle with respect to each other. Connector 100 can be manufactured from plastic or other suitable materials, such as through injection molding, and can be a unitary structure.

FIGS. 1B and 1C show two opposing sides of connector 100. In FIG. 1B, a hole 112 is shown between receptacles 102 and 104. Hole 112 is adapted to receive a cover rod or tube for supporting a cover over an enclosure formed using a plurality of connectors 100. A panel tube or rod can be inserted into receptacles of FIG. 1B. FIG. 1C shows the other side of connector 100. If the connector is used as a top connector, hole 112 can be used to receive a cover rod or tube. If the connector is used as a bottom connector, walls 110 can be used as legs for the enclosure.

Figure 2:
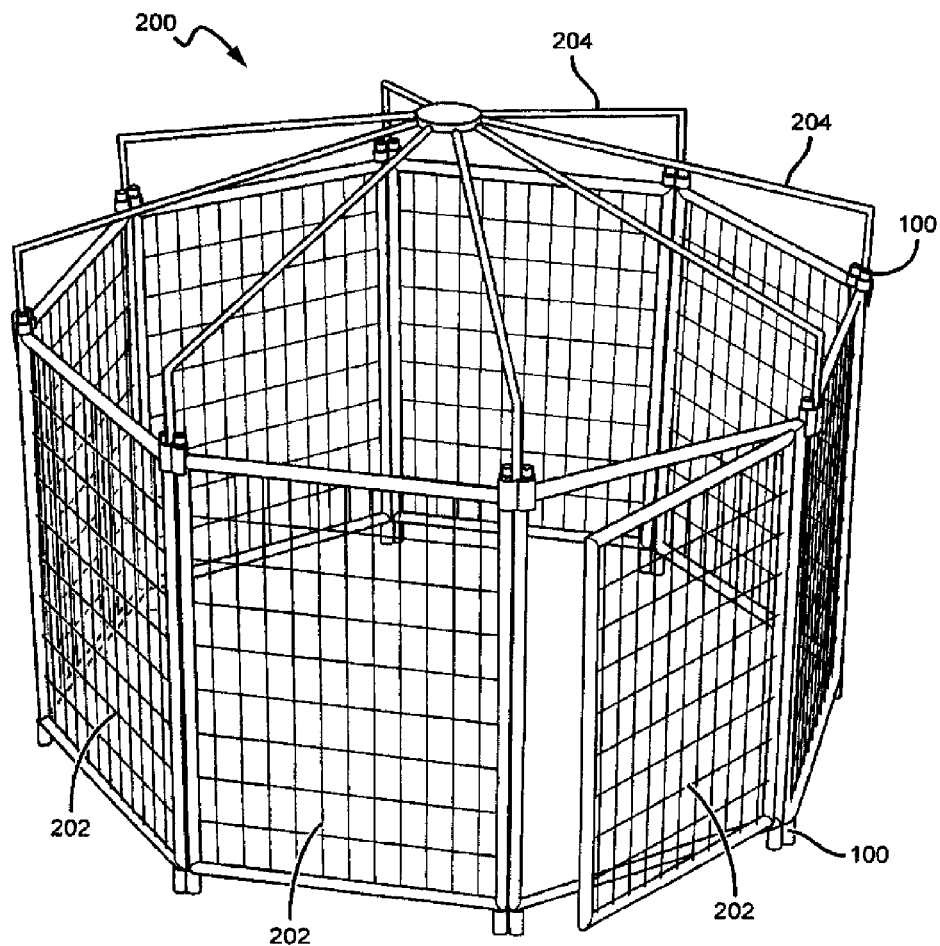
FIG. 2 is a perspective view of an enclosure secured with the connectors of FIGS. 1A-1C, according to one embodiment.

FIG. 2 is a perspective view of an enclosure 200 secured with a plurality of connectors 100 according to one embodiment. Here, there are eight panels, secured by eight top connectors 100 and eight bottom connectors 100. Note that panels are referred to generically here, but can include a door panel (as shown), a window panel, or other suitable types of panels. Each panel has a tubular or cylindrical rod or tube that slides into receptacles 102 and 104. Thus, each panel 202 is secured to an adjacent panel 202 with a top connector 100 and a bottom connector 100. Walls 110 maintain each panel 202 at an approximately 45° angle to each other. Also shown are cover rods 204 that have been inserted into holes 112. Thus, eight cover rods 204 can be used to form the support for a cover (not shown) to cover enclosure 200.

Figure 3B:
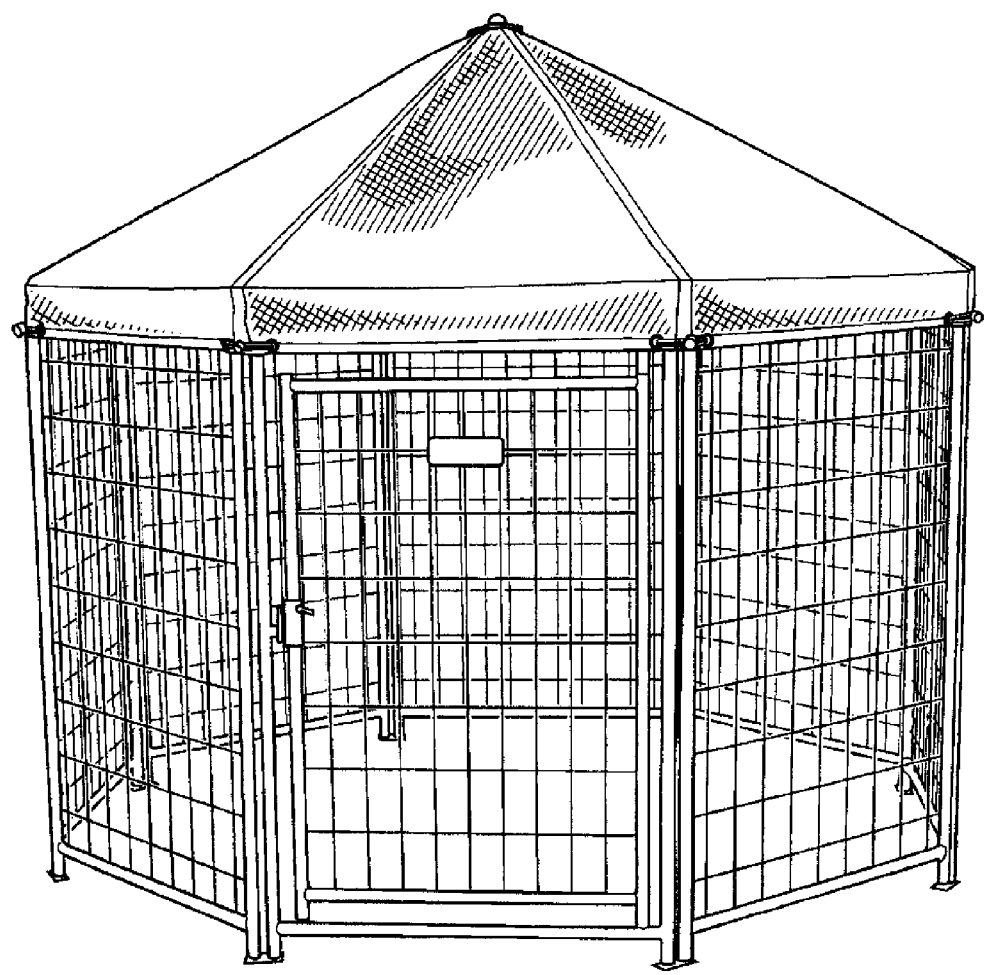

FIGS. 3A and 3B are pictures of an enclosure 200 with a cover 300 secured with eight of connectors 100 according to one embodiment.

Figure 4B:
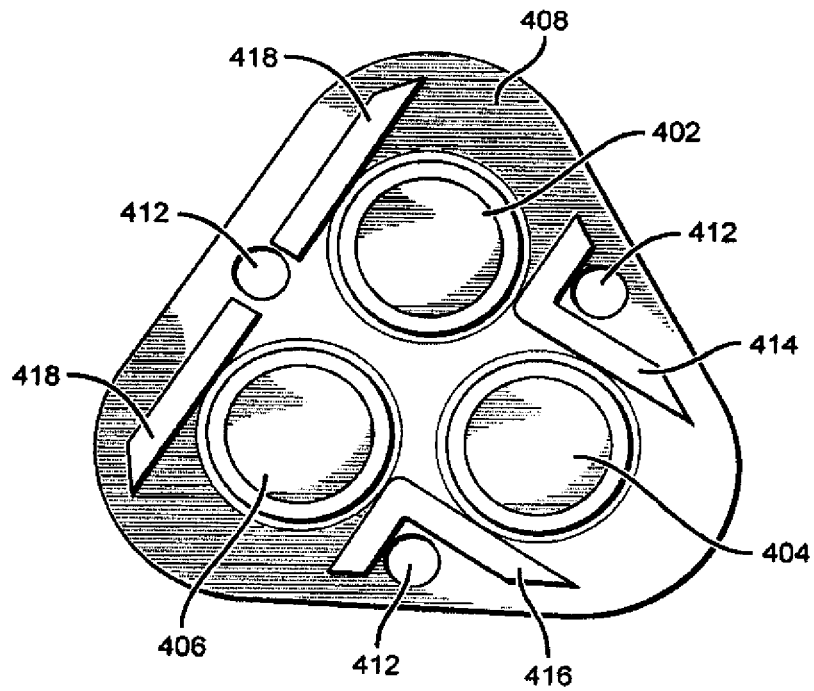
FIG. 4B is a view of one side of the connector of FIG. 4A according to one embodiment.
Figure 4C:
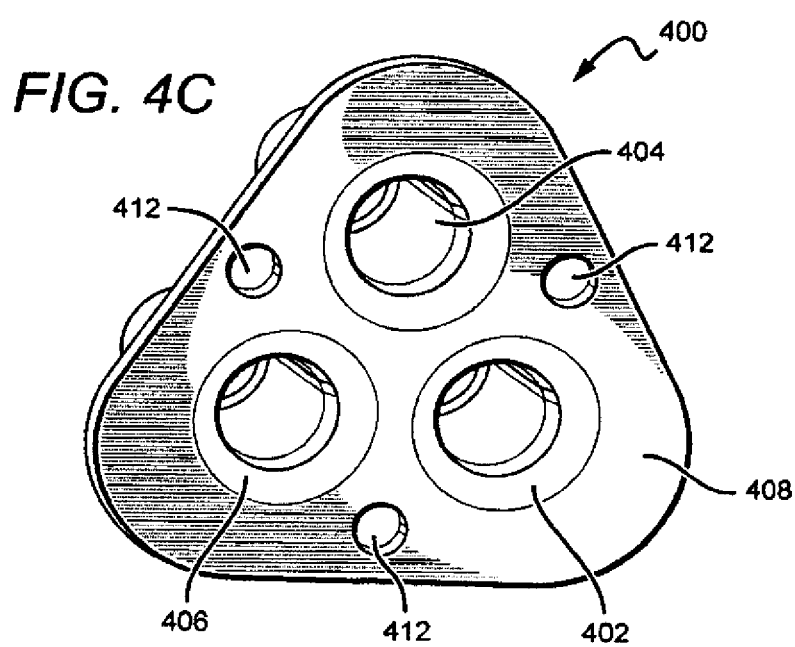
FIG. 4C is a view of the opposing side of the connector of FIGS. 4A and 4B according to one embodiment.

FIGS. 4A-4C show a three-receptacle connector 400 according to one embodiment. In FIG. 4A, three receptacles 402, 404, 406 are shown extending from a triangular base 408. Each receptacle has a close end 410. There are a plurality of walls extending from the base (described in detail with respect to FIG. 4B). A hole 412 extends through each side of connector 400. As with the embodiment of FIGS. 1A-1C, receptacles 402, 404, 406 receive a panel tube or rod along the interior of each receptacle. Holes 412 are adapted to receive cover tubes or rods, and the walls are adapted to maintain the panels in the desired positions. Connector 400 can be manufactured from plastic or other suitable materials, such as through injection molding, and can be a unitary structure.

FIGS. 4B and 4C show two opposing sides of connector 400. In FIG. 4B, a first wall 414 is a 90° or right-angled wall between receptacles 402 and 404. Hole 412 is within angled first wall 414. Similarly, a second wall 416 is a 90° or right-angled wall between receptacles 404 and 406, with hole 412 within angled second wall 416. A pair of straight walls 418 is positioned along the third side of triangular base 408, with each straight wall 418 adjacent receptacle 402 and 406. Hole 412 is located between the pair of straight walls 418. Similar to connector 100, connector 400 can be used as a top or a bottom connector for an enclosure. FIG. 4C shows the other side of connector 400. If the connector is used as a top connector, hole 412 can be used to receive a cover rod or tube. If the connector is used as a bottom connector, receptacles 402, 404, 406 can be used as legs for the enclosure. Note that the length of the walls and/or receptacles in different embodiments may vary. For example, the receptacles do not need to be longer than the walls in the three-receptacle connector and the walls do not need to be longer than the receptacles in the two-receptacle connector.

With connector 400, two or three panels can be connected using a top and bottom connector. Using two panels, a straight connection (or 180°) between two panels can be made by inserting panel rods into receptacles 402 and 406. Walls 418 keep the panels in a straight line position. Also, using two panels, a right angle or 90° connection between two panels can be made by inserting one panel rod into receptacle 404 and the other panel rod into either receptacle 402 or receptacle 406. First wall 414 or second wall 416 keep the adjacent panels in a right angle relationship. Using three panels, a "T" configuration can be secured by inserting a panel rod into each of receptacles 402, 404, 406. Walls 414, 416, 418 keep the three panels in the desired "T" relationship.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have described two and three receptacle connectors with specific wall orientations. However, connectors have more receptacles and/or different wall orientations are also suitable to achieve advantages of the present invention. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A connector for connecting a structure, comprising:
    a base;
    a first receptacle comprising a first open end and a first closed end which extends from the base, wherein said first closed end is farther away from said base than said first open end;
    a second receptacle comprising a second open end and a second closed end which extends from the base, wherein said second closed end is farther away from said base than said second open end;
    a first wall adjacent to both said first and second receptacles extending from said base in a same direction as said first receptacle and positioned between said first receptacle and a first edge of said base;
    a second wall adjacent to both said first and second receptacles extending from said base in the same direction as said first wall and positioned between said second receptacle and a second edge of said base, wherein said first and second walls extend from said base a greater distance than said first and second receptacles; and
    a first opening in said base.

2. The connector of claim 1, wherein said first opening is between said first and second receptacles.

3. The connector of claim 1, wherein said first wall is angled away from said first and second receptacles and said second wall is angled toward said first and second receptacles.

4. The connector of claim 3, wherein said angled walls have a substantially 45° angle.

5. The connector of claim 1, wherein said first and second walls extend beyond said closed ends of said first and second receptacles.

6. The connector of claim 1, wherein said connector is unitary.

7. The connector of claim 1, wherein said first and second receptacles are circular.

8. The connector of claim 1, wherein said first receptacle and said second receptacle are positioned between said first wall and said second wall.

9. The connector of claim 1, wherein said first opening is between said first wall and said second wall.

10. The connector of claim 1, wherein said first receptacle and said second receptacle are adjacent to one another with no intervening walls therebetween.

11. The connector of claim 1, wherein said first receptacle is adapted to receive a first tube for connecting the structure and said second receptacle is adapted to receive a second tube for connecting the structure.

12. The connector of claim 1, wherein said first opening in said base is adapted to receive a rod for supporting a cover for the structure.

13. A connector for connecting a structure, comprising:
    a base;
    a first partially enclosed space extending from said base and comprising a body portion defining an internal cavity, said first partially enclosed space comprising a first open end and a first closed end, wherein said first closed end is farther away from said base than said first open end;
    a second partially enclosed space extending from said base and comprising a body portion defining an internal cavity, said second partially enclosed space comprising a second open end and a second closed end, wherein said second closed end is farther away from said base than said second open end;
    a first wall adjacent to both said first and second partially enclosed spaces extending from said base in a same direction as said first partially enclosed space and positioned between said first partially enclosed space and a first edge of said base;

a second wall adjacent to both said first and second partially enclosed spaces extending from said base in the same direction as said first wall and positioned between said second partially enclosed space and a second edge of said base, wherein said first and second walls extend from said base a greater distance than said first and second partially enclosed spaces; and a first opening in said base.

14. The connector of claim 13, wherein said first and second partially enclosed spaces are circular.

15. A connector for connecting a structure, comprising:
a base;
a first receptacle extending from said base, said first receptacle comprising a first open end and a first closed end, wherein said first receptacle is in a fixed position, wherein said first closed end is farther away from said base than said first open end;
a second receptacle extending from said base, said second receptacle comprising a second open end and a second closed end, wherein said second receptacle is in a fixed position, wherein said second closed end is farther away from said base than said second open end;
a first wall adjacent to both said first and second receptacles, said first wall extending from said base in a same direction as said first receptacle and positioned between said first receptacle and a first edge of said base; and
a second wall adjacent to both said first and second receptacles, said second wall extending from said base in a same direction as said first wall and positioned between said second receptacle and a second edge of said base.

16. The connector of claim 15, wherein said first and second partially enclosed spaces are circular.

17. A connector for connecting a structure, comprising:
a base;
a first partially enclosed space extending from said base and comprising a body portion defining an internal cavity, said first partially enclosed space comprising a first open end and a first closed end, said first closed end farther away from said base than said first open end, wherein said first partially enclosed space is in a fixed position;
a second partially enclosed space extending from said base and comprising a body portion defining an internal cavity, said second partially enclosed space comprising a second open end and a second closed end, said second closed end farther away from said base than said second open end, wherein said second partially enclosed space is in a fixed position;
a first wall adjacent to both said first and second partially enclosed spaces, said first wall extending from said base in a same direction as said first partially enclosed space and positioned between said first partially enclosed space and a first edge of said base; and
a second wall adjacent to both said first and second partially enclosed spaces, said second wall extending from said base in a same direction as said first wall and positioned between said second partially enclosed space and a second edge of said base.

* * * * *